United States Patent [19]

Cogen et al.

[11] Patent Number: 5,357,020
[45] Date of Patent: Oct. 18, 1994

[54] POLYSILOXANE WITH CHROMANOL MOIETY

[75] Inventors: Jeffrey M. Cogen, Flemington, N.J.; William B. Herdle, White Plains, N.Y.; Sari-Beth Samuels, Ramsey, N.J.

[73] Assignee: Union Carbide Chemicals & Plastics Technology Corporation, Danbury, Conn.

[21] Appl. No.: 128,856

[22] Filed: Sep. 29, 1993

[51] Int. Cl.$^5$ .............................................. C08G 77/04
[52] U.S. Cl. ........................................ 528/27; 528/29; 528/31; 528/33
[58] Field of Search ................. 528/27, 31, 33, 29; 525/479

[56] References Cited

U.S. PATENT DOCUMENTS

| | | | |
|---|---|---|---|
| 4,879,378 | 11/1989 | Foster et al. | 556/439 |
| 4,895,885 | 1/1990 | Foster et al. | 524/99 |
| 4,927,898 | 5/1990 | King, III et al. | 528/27 |
| 4,960,810 | 10/1990 | Foster et al. | 524/265 |
| 5,210,133 | 5/1993 | O'Lenick, Jr. | 528/29 |
| 5,218,008 | 6/1993 | Parrish | 528/48 |

OTHER PUBLICATIONS

Derwent Publication No. 87-232029/33 (25.12.85-J-P-296440-Nov. 7, 1987).

G. W. Burton, et al., "Autoxidation of Biological Molecules 4. Maximizing the Antioxidant Activity of Phenols", J. Am. Chem. Soc. 1985, 107, 7053-7065.

Primary Examiner—Melvyn I. Marquis
Assistant Examiner—Mark D. Sweet
Attorney, Agent, or Firm—B. L. Deppenbrock

[57] ABSTRACT

A polysiloxane having at least one chromanol moiety and its use as an antioxidant stabilizer in a polyolefin composition.

5 Claims, No Drawings

POLYSILOXANE WITH CHROMANOL MOIETY

FIELD OF THE INVENTION

The present invention relates to a polysiloxane having at least one chromanol moiety and its use as an antioxidant stabilizer in polyolefins. The present invention also relates to polyolefin compositions containing a polysiloxane having at least one chromanol moiety.

BACKGROUND OF THE INVENTION

Polyolefins, compositions containing them, and articles manufactured using them are prone to degradation accelerated by oxygen. The negative effects of oxygen are even more severe in the presence of heat or ultraviolet radiation. It is, therefore, customary to add chemicals often referred to as antioxidant stabilizers to polyolefins to inhibit the degradation caused by oxygen.

Vitamin E, also referred to as α-tocopherol (α-T), and related chromanols are among the most active antioxidants known due in large part to their exceptional ability to react with alkylperoxy radicals, thereby limiting the chain length of damaging oxidation chain reactions. A study of several chromanol antioxidants revealed that Vitamin E and related chromanols are capable of reacting as much as 370 times more rapidly with an alkylperoxy radical than 2,6-di-tert-butyl-4-methylphenol (BHT).

Despite their high inherent activity, chromanols have not gained general acceptance as antioxidants for polyolefins, due to the lack of permanence of chromanols in polyolefins. Lack of permanence generally is understood to mean that the chromanol can migrate out of the polyolefin, evaporate during storage or compounding of the polyolefin, and/or be extracted from the polyolefin by water or other aggressive media. Antioxidant permanence in polyolefins is made difficult by the high temperatures used to process polyolefins as well as the demanding environmental conditions to which articles containing polyolefins are subjected. Examples of demanding environmental conditions include exposure to rain (outdoor articles), food (food packaging), and hydrocarbon grease (telecommunication cable).

There is an on-going need to provide antioxidant stabilizers which are permanent in a polyolefin and which inhibit oxidation under demanding environmental conditions.

SUMMARY OF THE INVENTION

Accordingly, the present invention provides a compound comprising a polysiloxane having at least one chromanol moiety, which compound can be used as an antioxidant stabilizer in a polyolefin.

Still another embodiment of the present invention provides a composition comprising one or more polyolefins and a polysiloxane having at least one chromanol moiety.

DETAILED DESCRIPTION OF THE INVENTION

Polysiloxane With Chromanol Moiety

In the present invention the polysiloxane having a chromanol moiety has the general structure $$M_a D_b D^*_c T_d T^*_e Q_f M^*_g \quad (I)$$

wherein

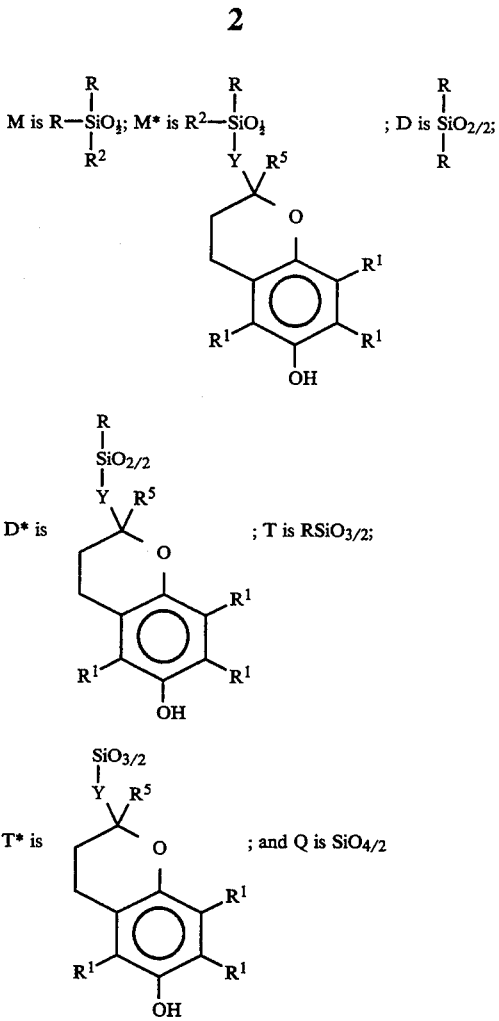

in the above formulae,
R is selected from the group consisting of an alkyl group having 1 to 20 carbon atoms, a phenyl group, an alkoxy group having 1 to 20 carbon atoms, and an alkenyl group having 1 to 20 carbon atoms;
$R^1$ is selected from the group consisting of hydrogen and an alkyl having 1 to 12 carbon atoms;
$R^2$ is selected from the group consisting of
 (i) an alkoxy having 1 to 20 carbon atoms,
 (ii) hydrogen,
 (iii) hydroxy,
 (iv) phenoxy,
 (v) halo,
 (vi) an alkyl having 1 to 20 carbon atoms,
 (vii) alkenyl having 1 to 4 carbon atoms, and
 (viii) acyloxy having 1 to 12 carbon atoms;
 (ix) an alkylamino group having 1 to 20 carbon atoms;
 (x) a dialkylamino group having 2 to 40 carbon atoms;
$R^5$ is an alkyl group having 1 to 10 carbon atoms;
Y is a linking group selected from the group consisting of
 (i) —O—,
 (ii) —$C_nH_{2n}$—,
 (iii) —$C_mH_{2m}O$—,
 (iv) —$CO_2C_nH_{2n}$—, and
 (v) —$C_mH_{2m}CO_2C_nH_{2n}$—
wherein n has a value ranging from 2 to 12 and m has a value ranging from 1 to 12 and wherein in Formula I
 a and g each range from 0 to 202;
 b and c each range from 0 to 200;
 d, e, and f each range from 0 to 50;
 and a+g is equal to 2f+d+e+2−2p with p being the number of rings present in the polysiloxane and ranging from 0 to 10; and c+e+g≧1.

Preferred polysiloxanes of the present invention have the Formulae II (acyclic) and III (cyclic) as follows:

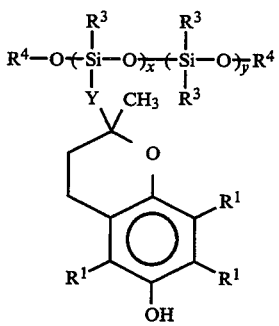

(II)

and

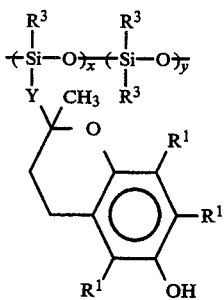

(III)

wherein in Formulae II and III
 each $R^1$ is individually hydrogen or a methyl group;
 $R^3$ is selected from the group consisting of a phenyl group, an alkyl group having 1 to 10 carbon atoms, and alkoxy group having 1 to 4 carbon atoms;
 $R^4$ is selected from the group consisting of a phenyl group, an alkyl group having 1 to 10 carbon atoms, and a trimethylsilyl group; and
 Y is a divalent linking group selected from the group consisting of (i) —O—, (ii) —$C_nH_{2n}$—, (iii) —$C_mH_{2m}O$—, (iv) —$CO_2C_nH_{2n}$— and (v) —$C_mH_{2m}CO_2C_nH_{2n}$—;
 x has a value ranging from 1 to 200; m has a value ranging from 1 to 12; n has a value ranging from 2 to 12; and y has a value ranging from 0 to 200. It is readily understood by those skilled in the art that the Y groups (i-v) in Formulae I, II and III are linked or bonded to the silicon of the polysiloxane via their latter end linkage.

Most preferably in Formulae II and III, $R^1$ and $R^3$ are methyl groups; and $R^4$ is a trimethylsilyl group. In Formula II, x ranges from 1 to 100; y ranges from 0 to 100. Further, in Formula III, x ranges from 1 to 6; y ranges from 0 to 5; and x+y ranges from 4 to 6. Most preferably, Y is selected from the group consisting of —$C_mH_{2m}O$—, —$CO_2C_nH_{2n}$—, and —$C_mH_{2m}CO_2C_nH_{2n}$—. It will be readily understood by those skilled in the art that the chromanol moiety can be attached in a pendant or terminal position on a polysiloxane. Preferably, the chromanol moiety is in a pendant position. As employed herein the chromanol moiety is defined as the radical:

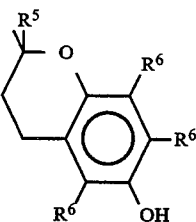

in which $R^5$ and $R^6$ are as defined in Formula IV below.

Preparation of Polysiloxanes Having a Chromanol Moiety

Polysiloxanes having at least one chromanol moiety can be prepared using procedures well known to those skilled in silicone chemistry. The polysiloxanes having at least one chromanol moiety can be random or blocked, and typically are random in structure. In general, a chromanol moiety containing compound has the formula:

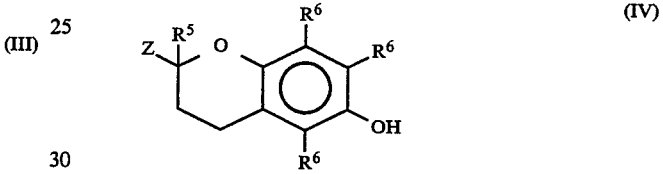

(IV)

In Formula IV, $R^5$ is an alkyl having 1 to 10 carbon atoms, and preferably, $R^5$ is an alkyl group having 1 to 4 carbon atoms. Most preferably, $R^5$ is a methyl group. And in Formula IV, each $R^6$ is individually a hydrogen or an alkyl group having 1 to 12 carbon atoms; preferably, each $R^6$ is a hydrogen or a methyl group. Preferably, in Formula IV, Z represents a group selected from the group consisting of —OH, —$C_mH_{2m}OH$, —$C_nH_{2n-1}$, —$CO_2C_nH_{2n-1}$, and —$C_mH_{2m}CO_2C_nH_{2n-1}$, wherein m has a value ranging from 1 to 12 and n has a value ranging from 2 to 12. Illustrative chromanol moiety containing compounds which can be attached directly to a silane or polysiloxane or which can be easily reacted to contain a Z substituent for attachment to a silane or to a polysiloxane are set forth in Table 1.

When the Z substituent contains an organic group having a carbon-carbon double bond (—C=C—), such as, for example, a $C_2$ to $C_{12}$ alkenyl group, the chromanol moiety containing compound can be directly attached to a silane containing an SiH group (=Si—H) or, preferably, to a siloxane containing an SiH group via a hydrosilation reaction. Hydrosilation processes are well known in the art and disclosed, for example, in U.S. Pat. Nos. 4,879,378; 4,888,375; and 4,946,880 and in EPA 892011239.4. In general, the chromanol containing moiety having a Z substituent with a —C=C— functionality is reacted with the SiH containing silane or siloxane in a solvent (e.g., toluene, xylene, or tetrahydrofuran) in the presence of a noble metal catalyst, typically chloroplatinic acid, at a temperature ranging from about −20° C. to 250° C. to produce a silane or polysiloxane with a pendant chromanol moiety. The silane having the pendant chromanol is further subjected to hydrolysis to form a polysiloxane with a pendant chromanol moiety. For ease of hydrosilation, it is generally preferred that the carbon-carbon double bond be a terminal double bond, i.e., —C═CH₂.

Chromanol moiety containing compounds which do not have a carbon-carbon double bond (—C═C—) in the Z substituent can be readily converted to a chromanol moiety containing compound having a Z substituent having a —C═C— by well known organic chemistry processes.

For example, when the chromanol moiety containing compound contains a Z having an —OH group it can be reacted with an allyl halide, such as, for example, XCH₂CH═CH₂ (where X is Br, Cl, or I, preferably Cl) in the presence of an alkali metal base (such as, for example, sodium hydroxide) to make a chromanol moiety containing compound in which Z is an unsaturated ether. The chromanol moiety containing compound in which Z is an unsaturated ether is then hydrosilated as set forth above. In some cases it may be desirable to first attach a blocking group to the OH attached to the aromatic ring as described in Scott, J. W., et al., *Helvetica Chimica Acta* Volume 59, 1976, p. 290.

Similarly, chromanol moiety containing compounds in which the Z substituent is an organic group having an amide group can be reacted with an unsaturated alcohol in the presence of a strong acid (e.g., sulfuric acid) to produce a chromanol moiety containing compound in which Z is a unsaturated ester, which is subsequently hydrosilated.

When the chromanol moiety containing compound contains a Z in which the organic group has a carboxylic acid group, (—COOH), or an ester group, (—COOR), it can be reacted, for example, with an unsaturated alcohol, such as, allyl alcohol (HOCH₂CH═CH₂) and, optionally, an acid or base accelerator (e.g., sodium hydroxide or sulfuric acid) to produce a chromanol moiety containing compound in which Z is an unsaturated ester. Again, the chromanol moiety containing compound in which Z is a unsaturated ester is hydrosilated as set forth above.

Further, chromanol moiety containing compounds containing carboxylic acid, hydroxy, or amide groups can be attached directly via dehydrocondensation reactions with a siloxane or silane having an SiH group in accordance with procedures set forth in U.S. Pat. No. 4,927,898, preferably in the presence of the catalyst, diiodo(2,5-cyclooctadiene)-platinum (II).

Additionally, a Z group containing an unsaturated ether group can be prepared in accordance with the procedure described by J. W. Scott et al. in the *Journal of the American Oil Chemist's Society*, Volume 51, 1974, pp. 200–203 by using an unsaturated alcohol, such as, for example, allyl alcohol, in place of methanol used in the reaction employed to prepare compound C10 of Table 1.

TABLE 1

| Structure | Formula | Reference |
|---|---|---|
| C1 | 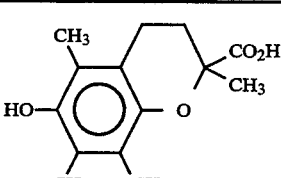 | 1,2 |
| C2 | | 1,2 |
| C3 | | 1 |
| C4 | | 1 |
| C5 | | 1,3 |
| C6 | | 1,4 |
| C7 | | 1 |
| C8 | | 1 |
| C9 | | 1 |

TABLE 1-continued

| Structure | Formula | Reference |
|---|---|---|
| C10 | HO—[ring with CH3, CH3, CH3]—O—C(OCH3)(CH3) | 1 |
| C11 | HO—[ring with H, H, H]—O—C(CO2H)(CH3) | 1 |
| C12 | HO—[ring with H, CH3, CH3]—O—C(CO2H)(CH3) | 1 |
| C13 | HO—[ring with H, H, and CH branch]—O—C(CO2H)(CH3) | 1 |
| C14 | HO—[ring with substituents]—O—C(CO2H)(CH3) | 1 |

References:
1) Scott, J. W. et al., Journal of the American Oil Chemist's Society, 1974 (51) pp 200-203;
2) Cohen, N. et al., Helvitica Chimien Actn, 1981 (64) pp 1158-1173;
3) Cohen, N. et al., Journal of Organic Chemistry, 1981 (46) pp 2445-2450;
4) Cohen, N. et al., Synthetic Communications, 1982 (12) pp 57-65.

Use of Polysiloxanes Having Chromanol Moiety In Polyolefins

The polysiloxanes having at least one chromanol group of the present invention are mixed, blended, or bonded with a polyolefin. The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulation materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be nonhalogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to its backbone; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin employed herein. The polypropylene can be prepared by conventional processes such as the process described in U.S. Pat. No. 4,414,132. The alpha-olefins in the copolymer are preferably those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include vinyl trimethoxysilane, and vinyl triisopropoxy silane. The alkenyl and alkoxy radicals can have 2 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, zinc octoate, iron 2-ethyl hexoate, and other metal carboxylates, as well as in the presence of lead naphthenate.

The homopolymers or copolymers of ethylene wherein ethylene is the primary comonomer and the homopolymers and copolymers of propylene wherein propylene is the primary comonomer may be referred to herein as polyethylene and polypropylene, respectively.

For each 100 parts by weight of polyolefin, the polysiloxane having the chromanol can be present in an amount ranging from about 0.01 to 5 parts, preferably from about 0.1 to 1 parts by weight.

The polyolefin can be one polyolefin or a blend of polyolefins. The organopolysiloxane containing at least one pendant chromanol group can either be bonded to the polyolefin and/or blended with the polyolefin. The composition containing the foregoing can be used in combination with disulfides, phosphites or other stabilizers and metal deactivators in molar ratios of about 1:10 to about 10:1 for additional oxidative and thermal stability. In order to bond the polysiloxane to the polyolefin, the polysiloxane may be substituted with a group that is reactive with the polyolefin such as, for example, a vinyl group or an acrylate group.

The following conventional additives can be added in conventional amounts if desired: ultraviolet absorbers, antistatic agents, pigments, dyes, fillers, slip agents, fire retardants, stabilizers, crosslinking agents, halogen scavengers, smoke inhibitors, crosslinking boosters, processing aids, e.g., metal carboxylates, lubricants, plasticizers, viscosity control agents, and blowing agents such as azodicarbonamide. The fillers can include, among others, magnesium hydroxide, aluminum hydroxide and alumina trihydrate.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Example 1

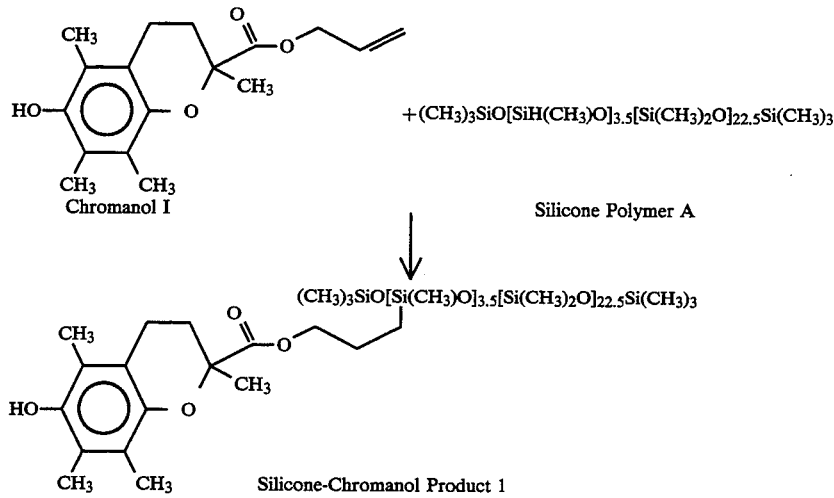

This example illustrates the hydrosilylation of a chromanol containing an unsaturated group onto a silicone polymer containing at least one SiH moiety.

In 0.88 grams of toluene is dissolved 0.48 millimoles of Chromanol I and 0.14 grams of a Silicone Polymer A. With stirring, under a nitrogen atmosphere, the mixture is charged with two microliters of isopropanol containing 40 micrograms of chloroplatinic acid, heated to 90° C. and maintained at that temperature until the SiH peak near 2100 cm$^{-1}$ is nearly disappeared as indicated using infrared spectroscopy (i.e. after about one hour). Analysis of the solution using $^{13}$C and $^{29}$Si NMR spectroscopy confirms the desired Silicone-Chromanol Product 1 above.

Examples 2

Using procedures similar to those described in Example 1, Silicone-Chromanol Products 2, 3 and 4 were prepared. Silicone Chromanol Products 2, 3 and 4 had the following structures:

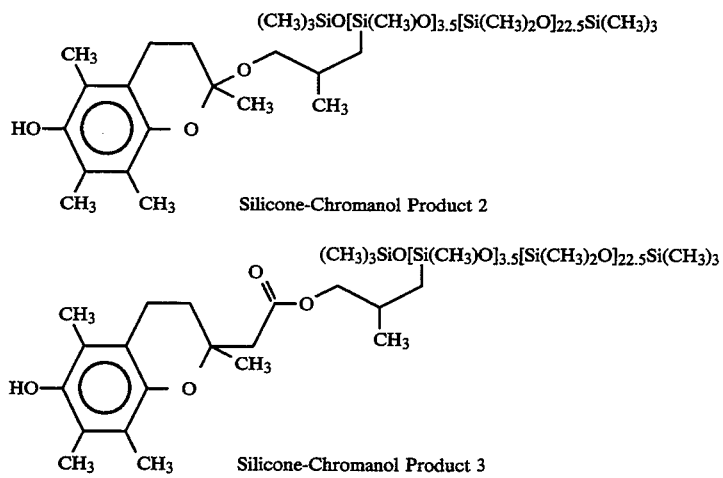

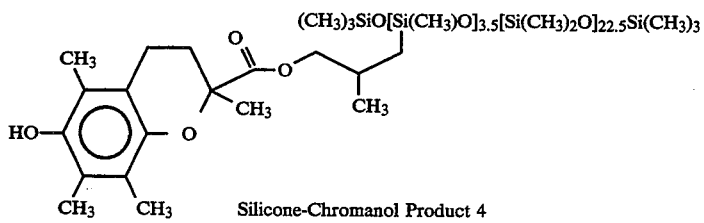

Silicone-Chromanol Product 4

Example 3

This example illustrates the use of the polysiloxanes having at least one pendant chromanol moiety as an antioxidant stabilizer in polyolefins. In this example, Silicone-Chromanol Product 4, as an antioxidant stabilizer, is blended with the polyolefin with the aid of a solvent (hexane). After allowing the solvent to evaporate the polyolefin sample is heated at 180° C. under forced oxygen gas in a differential scanning calorimeter. The oxidation induction time (OIT) is the time it takes for the sample to begin exothermic oxidation, and is related to the oxidative stability of the polyolefin sample. The higher the stability of the polyolefin sample, the longer is the OIT. In the case of some antioxidants stabilizers, no improvement in OIT is observed at 180° C., despite the fact that improvement in stability is observed at lower temperatures, such as 100° C., due to insufficient permanence of the antioxidant stabilizer at 180° C.

Five milligrams of Silicone-Chromanol Product 4 was mixed with five grams of n-hexane and blended with five grams of high density polyethylene. After allowing the solvent to evaporate in air overnight, the (OIT) was measured at 180° C. The OIT was 12 minutes for this polyolefin containing Silicone-Chromanol Product 4. In contrast, the OIT was less than one minute for the polyolefin without Silicone-Chromanol Product 4 as the antioxidant stabilizer, indicating the improved stability provided by and permanence of the antioxidant stabilizer, the polysiloxanes with a chromanol moiety of the present invention.

Evaluation as an antioxidant stabilizer as in Example 3 establishes the effectiveness of Silicone-Chromanol Products 2 and 3 as antioxidant stabilizers having permanence in polyolefins.

Example 4

This example illustrates the use of polyolefins containing polysiloxanes with a chromanol moiety in articles of manufacture requiring an antioxidant having a high degree of permanence. A typical telephone cable contains a plurality of metal conductors, each of which is coated with a polyolefin. In a grease-filled cable, interstices between the coated metal conductors are filled with hydrocarbon grease. To adequately protect the polyolefin in contact with cable filler grease, it is necessary that the antioxidant resist leaching from the polyolefin when it is in contact with such grease. Additional information concerning grease-filled cable can be found in Eoll, "The Aging of Filled Cable with Cellular Insulation", *International Wire & Cable Symposium Proceedings*, 1978, pages 156 to 170, and Mitchell et al., "Development, Characterization, and Performance of an Improved Cable Filling Compound", *International Wire & Cable Symposium Proceedings*, 1980, pages 15 to 25.

A polysiloxane with the chromanol moiety is blended with a polyolefin and is well mixed above the melting point of the polymer. The resulting stabilized polyolefin is extruded onto a copper wire. To test the coated wire for resistance to leaching of the antioxidant stabilizer, the coate4d copper wire is submerged in a jar of cable filling compound at 70° C. for four weeks. At one week intervals a sample of the caoted wire is removed from the grease, wiped free of grease using a tissue, and the OIT is determined at 200° C. Even after four weeks, the wire coated with the polyolefin containing the polysiloxane with the chromanol moiety shows a higher OIT than wire coated with polyolefin without the polysiloxane with the chromanol moiety.

What is claimed is:

1. A polysiloxane having at least one chromanol moiety, wherein the polysiloxane has the formula:

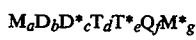

wherein

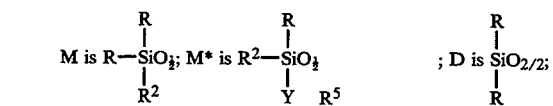

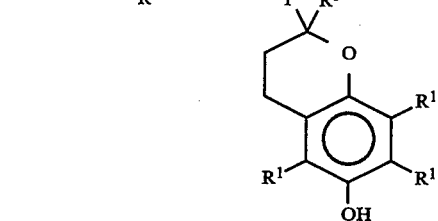

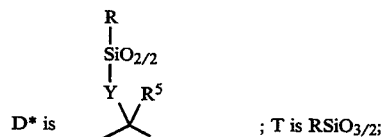

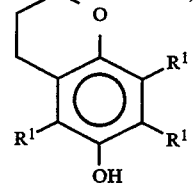

T* is 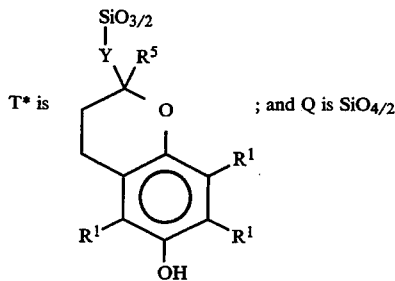 ; and Q is $SiO_{4/2}$

R is selected from the group consisting of an alkyl group having 1 to 20 carbon atoms, a phenyl group, an alkoxy group having 1 to 20 carbon atoms, and an alkenyl group having 1 to 20 carbon atoms;

$R^1$ is selected from the group consisting of hydrogen and an alkyl having 1 to 12 carbon atoms;

$R^2$ is selected from the group consisting of
(i) an alkoxy having 1 to 20 carbon atoms,
(ii) hydrogen,
(iii) hydroxy,
(iv) phenoxy,
(v) halo,
(vi) an alkyl having 1 to 20 carbon atoms,
(vii) alkenyl having 1 to 4 carbon atoms, and
(viii) acyloxy having 1 to 12 carbon atoms;
(ix) an alkylamino group having 1 to 20 carbon atoms,
(x) a dialkylamino group having 2 to 40 carbon atoms;

$R^5$ is an alkyl group having 1 to 10 carbon atoms;

Y is a linking group selected from the group consisting of
(i) —O—,
(ii) —$C_nH_{2n}$—,
(iii) —$C_mH_{2m}O$—,
(iv) —$CO_2C_nH_{2n}$—, and
(v) —$C_mH_{2m}CO_2C_nH_{2n}$—;

n has a value ranging from 2 to 12 and m has a value ranging from 1 to 12;

and wherein
a and g each range from 0 to 202;
b and c each range from 0 to 200;
d, e, and f each range from 0 to 50;
$a+g$ is equal to $2f+d+e+2-2p$
with p being the number of rings present in the polysiloxane and ranging from 0 to 10; and $c+e+g \geq 1$.

2. The polysiloxane of claim 1, wherein $R^1$ is selected from the group consisting of hydrogen and an alkyl having 1 to 4 carbon atoms.

3. The polysiloxane of claim 2, wherein Y is selected from the group consisting of —$C_mH_{2m}O$—; —$CO_2C_nH_{2n}$—; and —$C_mH_{2m}CO_2C_nH_{2n}$—.

4. The polysiloxane of claim 3, wherein $R^2$ is selected from the group consisting of an alkyl having 1 to 10 carbon atoms and an alkoxy having 1 to 10 carbon atoms.

5. The polysiloxane of claim 4, wherein R is a methyl group.

* * * * *